(12) United States Patent  (10) Patent No.: US 8,439,241 B2
Stangl et al.  (45) Date of Patent: May 14, 2013

(54) APPARATUS AND METHOD FOR DETACHING PORTIONS OF GLASS RODS

(75) Inventors: Albert Stangl, Buch am Erlbach (DE); Johann Piegendorfer, Altfraunhofen (DE); Martin Zöttl, Tiefenbach (DE); Michael Kopp, Landshut (DE)

(73) Assignee: Schott AG (DE)

( * ) Notice: Subject to any disclaimer, the term of this patent is extended or adjusted under 35 U.S.C. 154(b) by 886 days.

(21) Appl. No.: 11/687,074

(22) Filed: Mar. 16, 2007

(65) Prior Publication Data

US 2008/0006669 A1    Jan. 10, 2008

(30) Foreign Application Priority Data

Mar. 16, 2006  (DE) .................. 10 2006 012 582

(51) Int. Cl.
*B26F 3/00* (2006.01)

(52) U.S. Cl.
USPC ................................ 225/2; 225/94

(58) Field of Classification Search ........... 225/2, 94; 83/490
See application file for complete search history.

(56) References Cited

U.S. PATENT DOCUMENTS

| | | | | |
|---|---|---|---|---|
| 2,685,764 A | * | 8/1954 | Hatfield, Jr. | 30/164.95 |
| 3,718,268 A | * | 2/1973 | Insolio | 225/2 |
| 3,737,020 A | * | 6/1973 | Bauman | 198/468.01 |
| 3,880,029 A | * | 4/1975 | Bonaddio et al. | 83/880 |
| 4,027,562 A | * | 6/1977 | Bonaddio | 83/881 |
| 4,039,309 A | * | 8/1977 | Albanese et al. | 65/433 |
| 4,104,939 A | | 8/1978 | Bonaddio | |
| 4,105,150 A | * | 8/1978 | Insolio | 225/96.5 |
| 4,137,803 A | * | 2/1979 | Goldinger | 83/881 |
| 4,196,830 A | * | 4/1980 | Oravitz et al. | 225/2 |
| 4,418,855 A | * | 12/1983 | Lamarche et al. | 225/96 |

(Continued)

FOREIGN PATENT DOCUMENTS

| | | |
|---|---|---|
| DE | 28 46 079 B1 | 1/1980 |
| GB | 2436105 A * | 9/2007 |

(Continued)

OTHER PUBLICATIONS

"British Office Action for British International Application No. GB 704962.0", Dec. 1, 2010, Publisher: British Intellectual Property Office, Published in: GB.

(Continued)

*Primary Examiner* — Sean Michalski
(74) *Attorney, Agent, or Firm* — Kaplan Breyer Schwarz & Ottesen, LLP

(57) ABSTRACT

The invention is based on the object of improving the detachment of portions of a glass rod to the extent that a very planar, uniform fracture surface is produced. For this purpose, an apparatus according to the invention for detaching portions of glass rods comprises a device for the parallel holding and lateral fixing of a number of glass rods, a scoring wheel holder with a scoring wheel rotatably mounted parallel to the axis of the glass rods, at least one pressing spring for pressing the scoring wheel and the glass rods against one another, a device for guiding the glass rods and the scoring wheel past one another in a direction perpendicular to the axis of the glass rods, a holddown means for pressing against the glass rods, a breaking bar and a breaking beam, the breaking bar being arranged opposite, between the holddown means and the breaking beam.

28 Claims, 5 Drawing Sheets

U.S. PATENT DOCUMENTS

Figure 8:
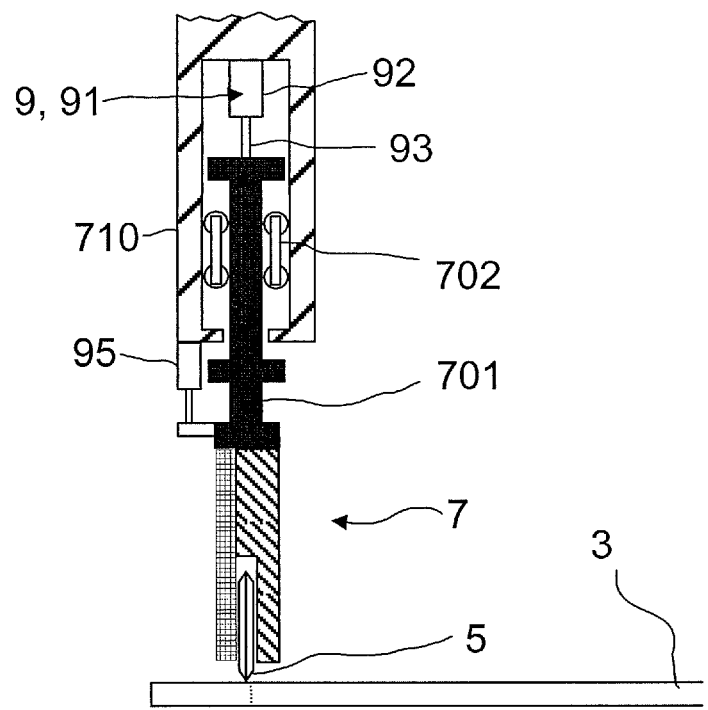

| | | | |
|---|---|---|---|
| 4,434,554 A * | 3/1984 | Korbelak | 30/90.8 |
| 4,473,942 A * | 10/1984 | Ridgway | 29/869 |
| 4,730,763 A * | 3/1988 | Smith | 225/96 |
| 5,038,654 A * | 8/1991 | Mackey | 83/880 |
| 5,106,006 A * | 4/1992 | Suda et al. | 225/2 |
| 5,125,549 A * | 6/1992 | Blackman et al. | 225/96.5 |
| 5,129,567 A * | 7/1992 | Suda et al. | 225/96.5 |
| 5,480,081 A * | 1/1996 | Wilson et al. | 225/96.5 |
| 6,337,943 B1 * | 1/2002 | Dumitriu | 385/137 |
| 6,510,271 B1 * | 1/2003 | Beldycki | 385/134 |
| 6,978,071 B2 * | 12/2005 | Hwang et al. | 385/134 |
| 2002/0084301 A1 * | 7/2002 | Murgatroyd | 225/105 |
| 2003/0024909 A1 * | 2/2003 | Hoekstra et al. | 219/121.69 |
| 2004/0155085 A1 * | 8/2004 | Takamatsu et al. | 225/2 |
| 2005/0226586 A1 * | 10/2005 | Watte et al. | 385/134 |
| 2006/0018605 A1 * | 1/2006 | Luther et al. | 385/85 |
| 2006/0255083 A1 * | 11/2006 | Bonaddio et al. | 225/2 |
| 2010/0044406 A1 * | 2/2010 | Ohmura et al. | 225/2 |
| 2010/0154614 A1 * | 6/2010 | Liao et al. | 83/880 |
| 2010/0163593 A1 * | 7/2010 | Song et al. | 225/96 |

FOREIGN PATENT DOCUMENTS

| | | | |
|---|---|---|---|
| GR | 197333 | | 9/1924 |
| GR | 1 493 126 | | 11/1977 |
| JP | H06-219761 A | | 8/1994 |
| JP | 11263635 A | * | 9/1999 |
| JP | 2000156101 A | * | 6/2000 |
| JP | 2002241142 A | | 8/2002 |
| JP | 2002284540 A | | 10/2002 |

OTHER PUBLICATIONS

"Japanese Office Action for International Patent Application No. 2007-067775", Jul. 20, 2010, Publisher: Japanese Patent Office, Published in: JP.

Chinese Patent Office, "Chinese Office Action for parallel International Application 200710101613.4", Aug. 30, 2010, Publisher: Chinese Patent Office, Published in: CN.

Hall, Dr. Matthew, "GB Application No. GB0704962.0 Office Action Aug. 2, 2011", Publisher: UK IPO, Published in: GB.

Yamazaki, Naoya, "JP Application No. 2007-067775 Office Action Nov. 24, 2011", Publisher: JPO, Published in: JP.

* cited by examiner

Fig. 1
Fig. 2
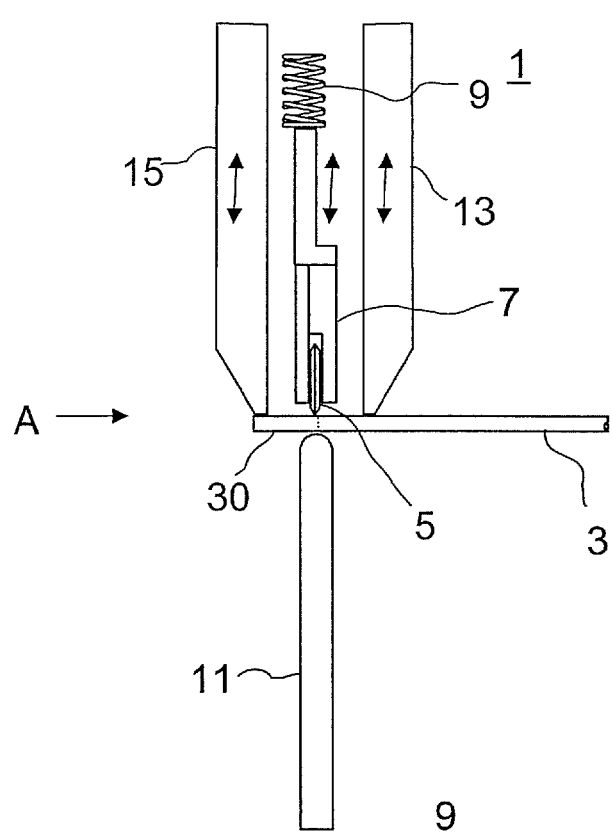
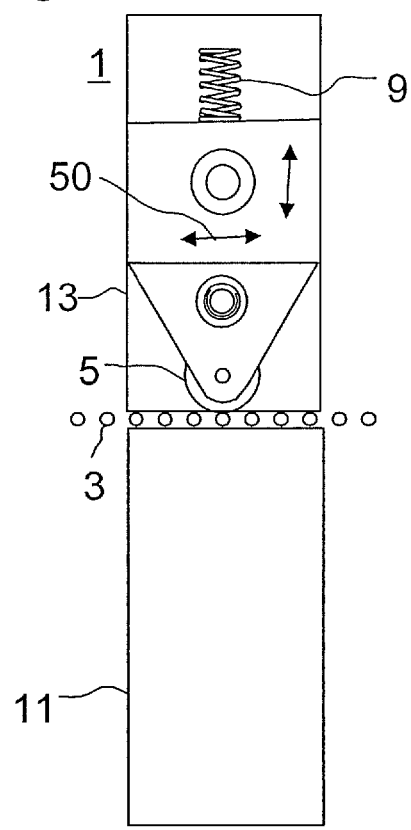
Fig. 3
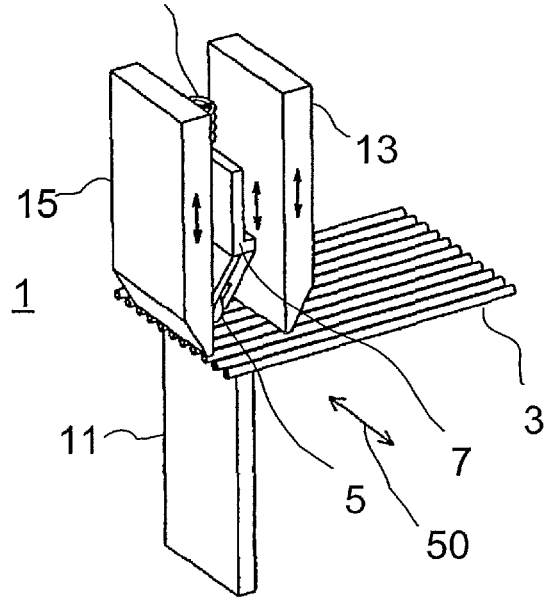

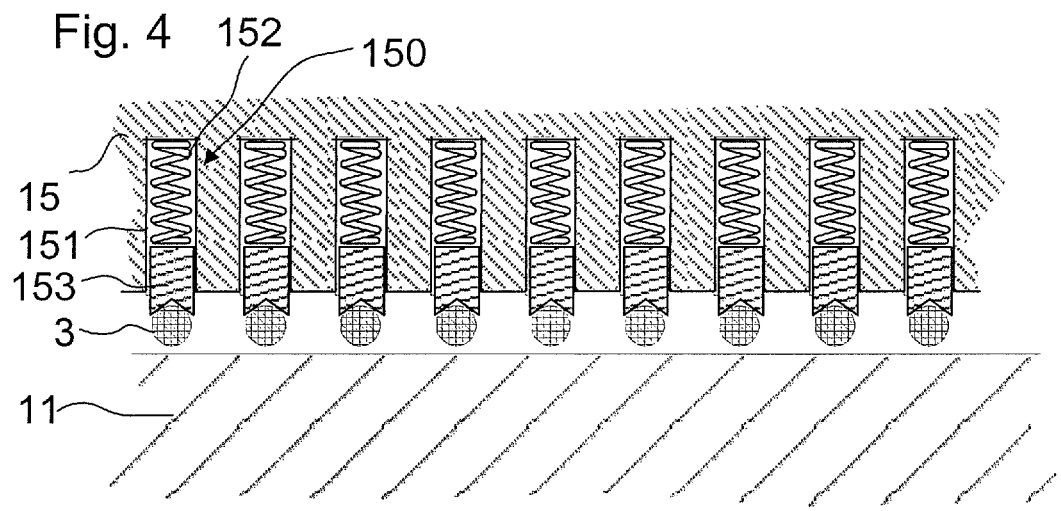
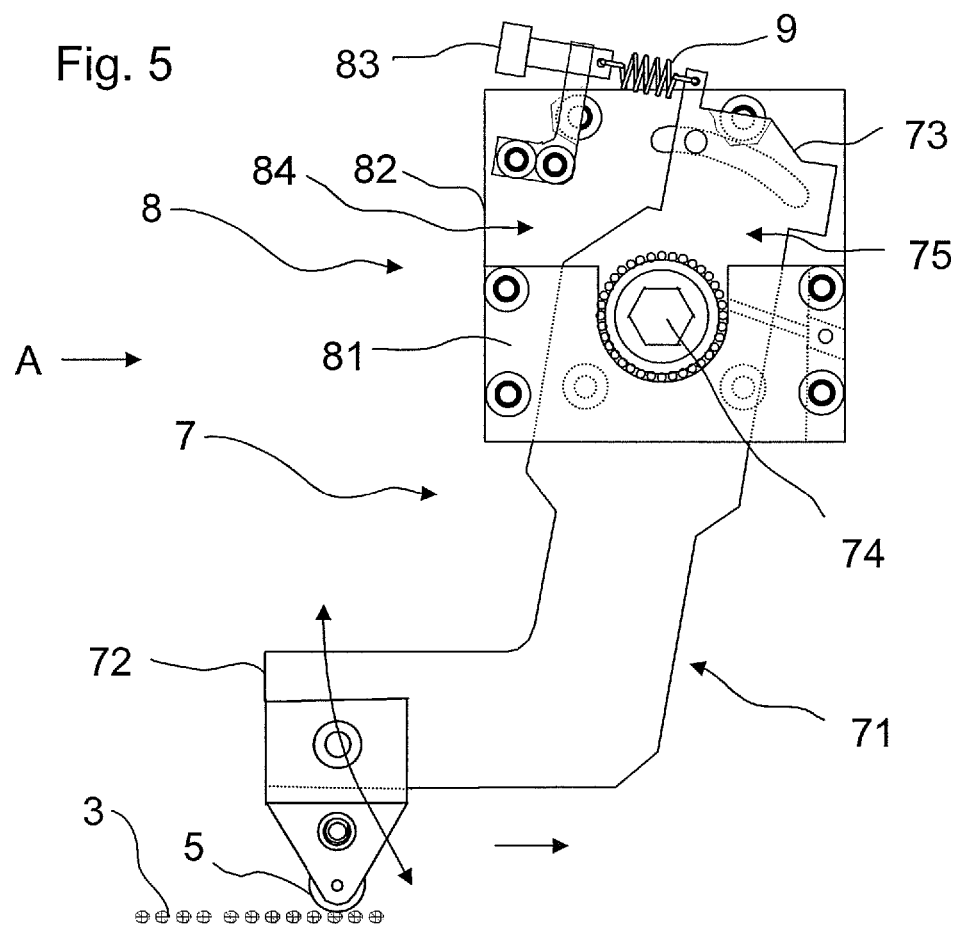

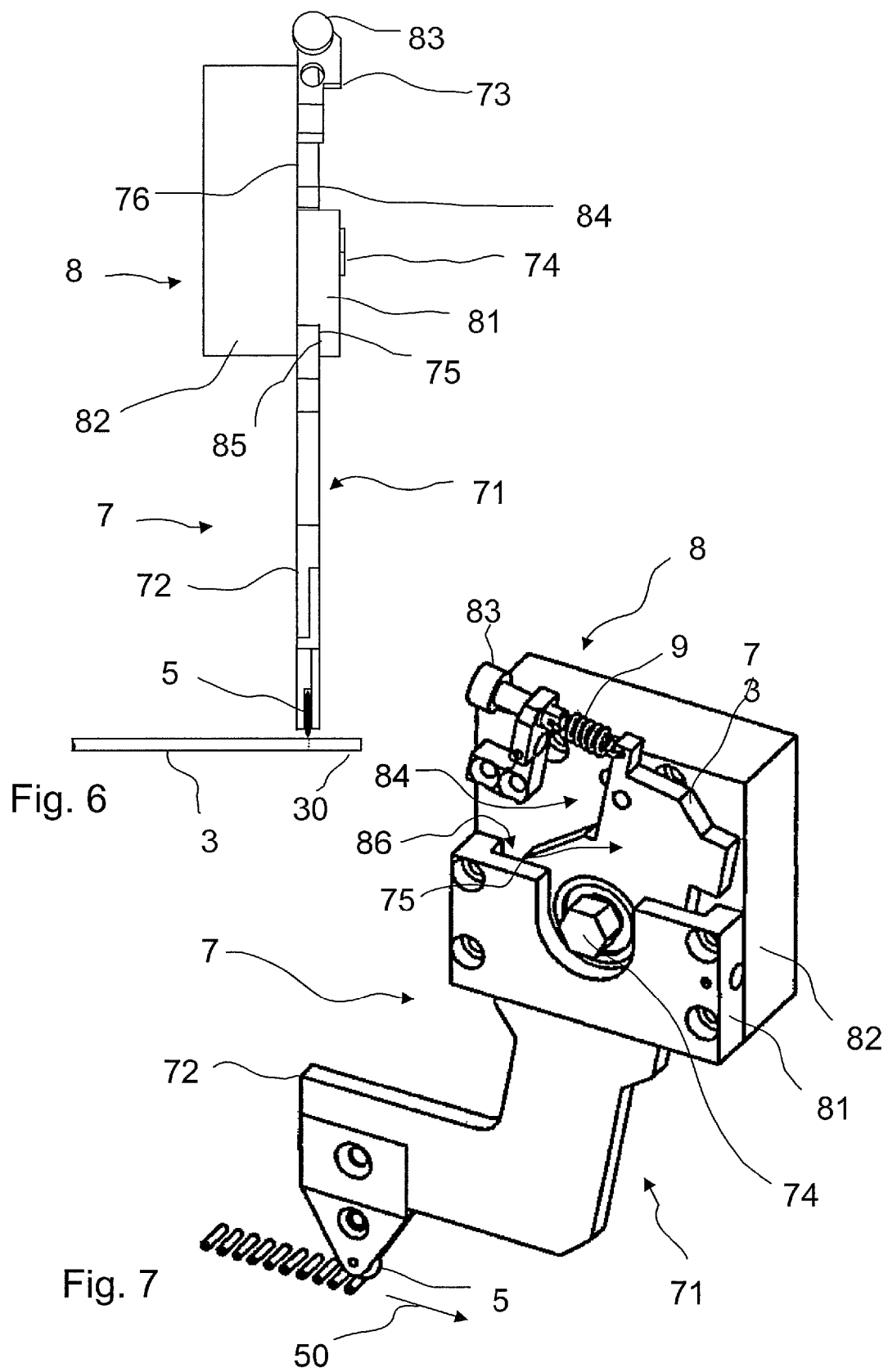

APPARATUS AND METHOD FOR DETACHING PORTIONS OF GLASS RODS

The invention relates generally to the detachment of portions of glass rods, in particular by means of scored breaking.

In order to produce portions of glass rods, it is known for portions first to be produced by scoring and breaking. However, for many applications the end faces of the portions thereby created generally do not have a satisfactory form, so that reworking steps are used. For example, end faces that are particularly planar and free from defects are required in the case of optical waveguides for low-loss coupling in and out of the light. In order to obtain such surfaces, for optical waveguides the end faces are for example subsequently treated by grinding and polishing.

However, compared with the detaching operation itself, the grinding and polishing is very time-consuming. Furthermore, the length of the optical waveguide is reduced during grinding and polishing. If an exact length is important, it is accordingly necessary to detach a correspondingly longer portion and continue grinding until this has made up for the tolerances associated with the breaking. This additionally prolongs the grinding and polishing process.

The invention is therefore based on the object of improving the detachment of portions of a glass rod to the extent that a very planar, uniform fracture surface is produced, so that it is possible to dispense with subsequent grinding and polishing. This object is already achieved in an extremely surprisingly simple way by the subject matter of the independent claims. Advantageous developments and refinements of the invention are specified in the dependent claims.

An apparatus according to the invention for detaching portions of glass rods accordingly comprises a device for the parallel holding and lateral fixing of a number of glass rods, a scoring wheel holder with a scoring wheel rotatably mounted parallel to the axis of the glass rods, at least one pressing spring for pressing the scoring wheel and the glass rods against one another, a device for guiding the glass rods and the scoring wheel past one another in a direction perpendicular to the axis of the glass rods, a holddown means for pressing against the glass rods, a breaking bar and a breaking beam, the breaking bar being arranged opposite, between the holddown means and the breaking beam.

In the case of the method that can be performed with this, for detaching portions of glass rods, a number of glass rods are correspondingly held in a parallel and laterally fixed manner, the glass rods and a scoring wheel rotatably mounted parallel to the axis of the glass rods are guided past one another in a direction perpendicular to the axis of the glass rods and the scoring wheel and the glass rods are pressed against one another by means of at least one pressing spring, the glass rods being bent between a holddown means and a breaking beam by means of a breaking bar arranged between the breaking beam and the holddown means, and consequently portions of the glass rod being detached at the scoring location. For the breaking, both the breaking beam and the breaking bar or the holddown means may be moved, in order to exert on the glass rods a bending moment which leads to the breaking at the scoring location.

The breaking bar preferably serves at the same time as an abutment for the pressure exerted on the glass rods by the scoring wheel during the scoring. For this purpose, the breaking bar is also arranged opposite the scoring wheel 5, which is guided between the holddown means 15 and the breaking beam 13. The arrangement with the holddown means, breaking beam and breaking bar, arranged opposite the latter with respect to the glass rods, brings about an exact three-point bearing of the glass rods during scoring and breaking.

The inventive scoring and breaking of a number of glass rods arranged in parallel in one working step achieves the effect of more exact guidance of the scoring wheel over the relatively long scoring distance and a more uniform pressing force. Consequently, deviations in the length of the detached portions are reduced. In particular, very planar fracture surfaces perpendicular to the axis of the portions can be produced with this arrangement. They are of such high quality that they can also be used without further working as low-loss coupling-in and out faces for optical waveguides.

To achieve a high degree of exactness in the length of the detached glass rod portions, it is further provided that the scoring wheel is rotatably mounted without any play in the axial direction. Both diamond scoring wheels and scoring wheels of hardened steel, in particular coated with hard material, may be used.

Furthermore, it is favorable for planar fractures if a bending moment that is as equal as possible for all the glass rods is exerted. In order to accomplish this, it is of advantage if the breaking bar and the breaking beam extend in a direction perpendicular to the axis of the glass rods.

It has surprisingly been found that planar fracture surfaces extending exactly perpendicular to the axis of the glass rods, or the detached portions, can be produced precisely when the scoring extends around only part of the circumference of the glass rod. The glass rods can therefore be easily mounted in a rotationally fixed manner during the scoring by the device for parallel holding and lateral fixing.

The invention therefore provides, inter alia, the following measures, in order when detaching portions of a glass rod to produce fracture surfaces that are so exact as to eliminate the need for subsequent treatment by grinding and polishing:
  exact mounting of the scoring wheel,
  exact guidance of the scoring wheel holder,
  precise pressing pressure of the scoring wheel against the glass by a pressing spring,
  interaction of breaking bar, holddown means and breaking beam.

With the invention, not only solid rods, as are used as optical waveguides, but also tubes of relatively long glass rods can be detached. These glass tubes are used for example for the encapsulation of electrical or electronic components. For example, such tubes may be used for the production of dry-reed switches, the reed contacts being introduced into the tubes and the ends of the tubes fused for encapsulation. Likewise, the tubes may also be processed to form encapsulations of transponders.

A development of the invention provides that the scoring wheel holder comprises a rotatably mounted lever, on which the scoring wheel is held. In particular, the pressing spring can in this case act on a lever arm of the lever. With such an arrangement, the spring forces of the spring can be stepped up before they are transferred to the scoring wheel.

In order to achieve particularly exact lateral guidance of the scoring wheel, it is further provided that the scoring wheel holder is laterally guided in a bearing block by means of corresponding guiding surfaces, in particular sliding surfaces on the bearing block and scoring wheel holder. The play in the mounting of the scoring wheel holder can be reduced by the corresponding guiding surfaces sliding past one another.

According to another development of the invention, the scoring wheel holder comprises a carriage which is guided transversely in relation to the direction of advancement and the axes of the glass rods, to which the scoring wheel is fastened and on which the pressing spring acts. Such an arrangement can be constructed with a particularly small mass and consequently low inertia. When the glass rods and scoring wheel are guided past one another and the scoring wheel rolls on the glass rods, the carriage is moved in the guide by the glass rods against the spring force of the pressing spring.

Furthermore, a hydraulic and/or pneumatic damping element may also be advantageously provided, in order to damp the movement of the scoring wheel. This is of advantage, inter alia, in order to achieve more uniform pressing of the scoring wheel against the glass rods when the scoring wheel rolls along.

The pressing spring may comprise an elastic solid element, for instance in the form of a spiral spring or leaf spring. According to a development of the invention, the scoring wheel may, however, also be pressed against the glass rods by a pneumatic pressing spring. Pneumatic pressing springs offer the advantage, inter alia, of allowing the pressing force to be set by means of the gas pressure. Furthermore, it is also possible to use a dynamic gas flow spring, in the case of which the pressing force is produced by means of a flowing medium. In the case of such a spring, a pressing force that is substantially independent of the deflection can be produced, which is favorable for the formation of a uniform scoring zone on the glass rod.

In a further refinement, the holddown means and/or the breaking beam has elastic holding elements for the glass rods, for the exertion of spring forces in the direction of the pressing direction of the scoring wheel. Consequently, the glass rods are pressed onto the opposite breaking bar by spring forces during the scoring.

To produce exact fracture edges, it has been found to be favorable if pressure is exerted on a glass rod by the scoring wheel for a time period of 0.05 of a second to 0.5 of a second. Both scoring that is too quick and scoring that is too slow lead to cavities and elevations.

By means of the invention as described above, glass rod portions on which the ends are fracture surfaces and the length tolerance of the portions is less than ±0.08 of a millimeter can be produced. A fracture surface in this sense is understood not as meaning for instance an end face of a glass rod portion that is produced by breaking and then further treated, for example by polishing. Rather, a fracture surface refers to a surface that is obtained directly by scored breaking. However, reworking of the edges of such a surface is not ruled out. This may be appropriate for example because the fracture edges are very sharp and can be easily chipped.

Apart from very good length tolerance, glass rod portions that can be produced according to the invention also have further excellent characteristics. For instance, fracture surfaces with an angularity perpendicular to the lateral surface of less than ±0.08 of a millimeter per millimeter of outside diameter can be achieved. The angularity is understood as meaning the maximum distance of the fracture surface from a planar surface arranged perpendicular to the lateral surface of the glass rod portion that touches the fracture surface at least one point. Furthermore, the fracture surfaces are also still very planar. For instance, fracture surfaces with a planarity of better than 0.06 of a millimeter per millimeter of outside diameter can be produced. The planarity is in this case the maximum distance of the fracture surface from a planar surface lying on the fracture surface.

To achieve optimum fracture surfaces, it has very surprisingly been found that it is not for instance scoring wheels with a perfect scoring edge that produce the best results. Rather, scoring wheels with a scoring edge that leaves behind a scoring zone with a width of at least 20 micrometers, with preference at least 40 micrometers, on the lateral surface of the glass rod are better. The scoring zone is the region within which scoring traces are left behind on the surface from a central axis of the region.

The invention is also suitable for producing very short glass rod portions, even to a length-to-diameter ratio of less than 1:1.

The invention is explained in more detail below on the basis of exemplary embodiments and with reference to the accompanying drawings. The same designations in the drawings relate to identical or similar parts.

Figure 9:
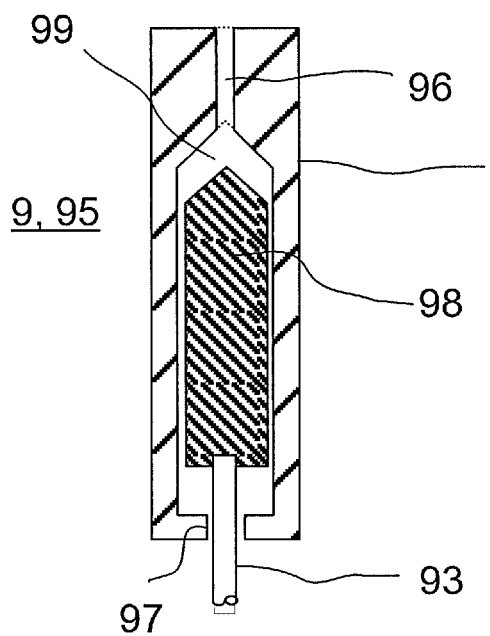
Figure 13:
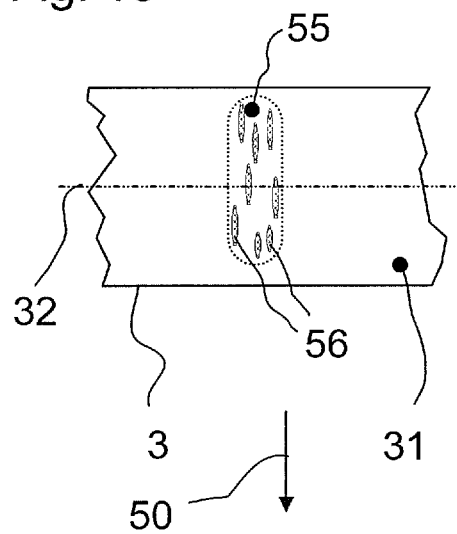
Figure 10:
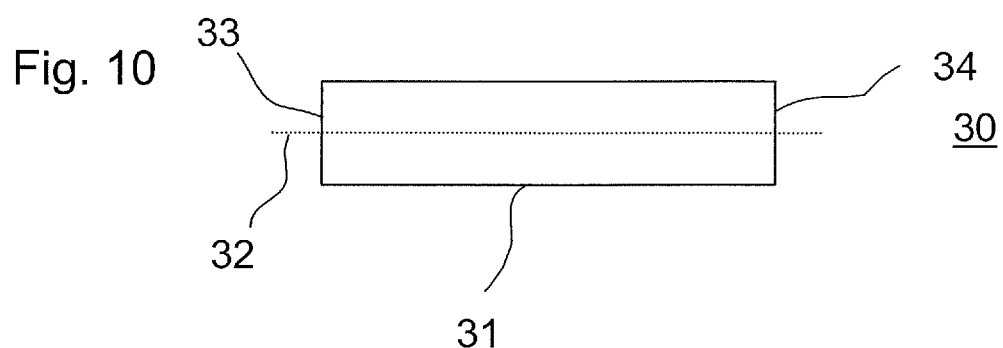
Figure 11:
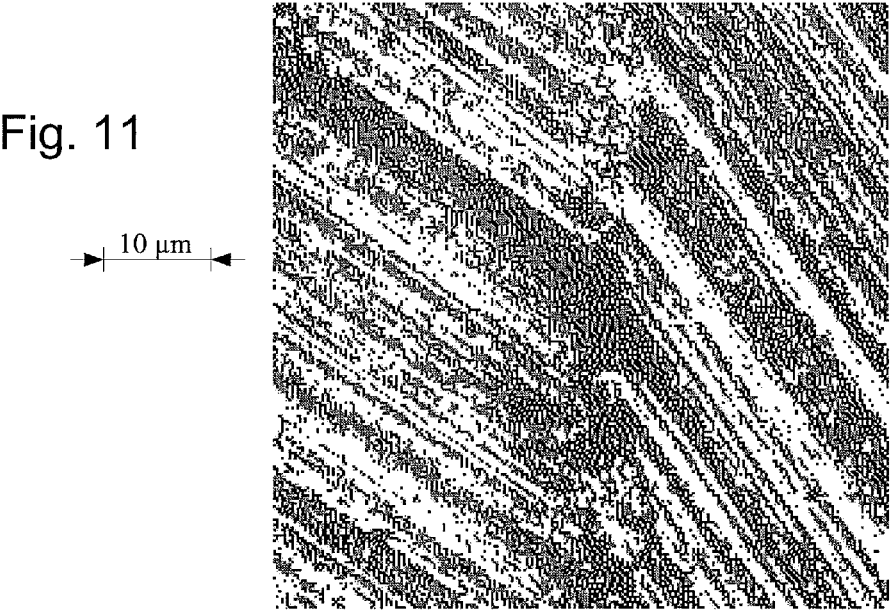
Figure 12:
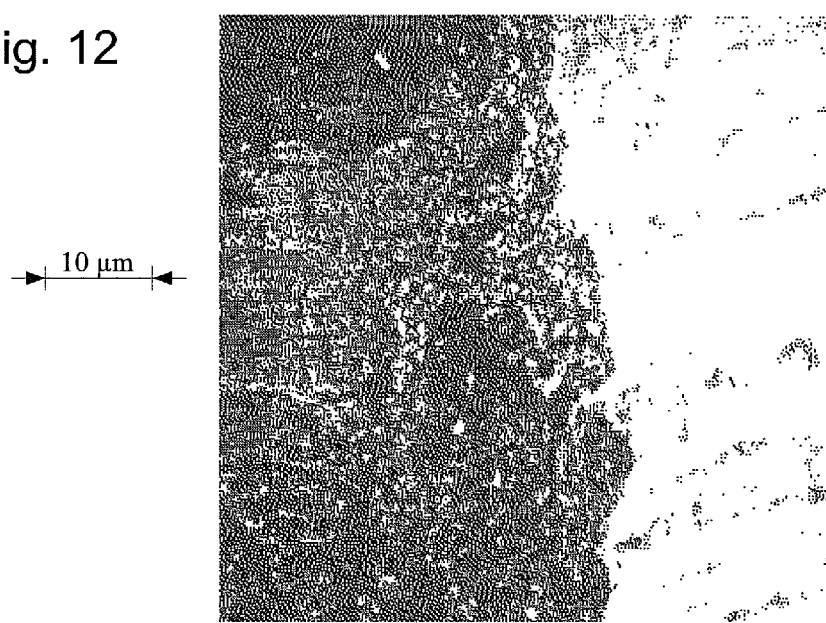

In the drawing:

FIG. 1 shows a schematic view of an exemplary embodiment of an apparatus according to the invention, FIG. 2 shows a view of the apparatus shown in FIG. 1 in the direction along the axes of the glass rods, FIG. 3 shows a perspective view of the apparatus shown in FIGS. 1 and 2, FIG. 4 shows details of the holddown means, FIG. 5 shows a side view with details of the scoring wheel holder, FIG. 6 shows a front view from the direction of the arrow "A" in FIG. 5, FIG. 7 shows a perspective view of the scoring wheel holder represented in FIGS. 5 and 6, FIG. 8 shows in a sectional representation a refinement of the exemplary embodiment schematically shown in FIGS. 1 to 3, FIG. 9 shows an exemplary embodiment of a pressing spring in the form of a dynamic gas flow spring, FIG. 10 shows a view of a glass rod portion produced according to the invention, FIG. 11 and FIG. 12 show scanning electron micrographs of the scoring edges of scoring wheels, and FIG. 13 schematically shows a view of a scored glass rod.

In FIG. 1, a schematic view of an apparatus 1 according to the invention for detaching portions of glass rods 3 is represented. FIG. 2 shows the arrangement from the view of the arrow "A" in FIG. 1.

The apparatus 1 for detaching portions of glass rods 3 comprises a device (not represented) for the parallel holding and lateral fixing of a number of glass rods 3, a scoring wheel holder 7 with a scoring wheel 5 rotatably mounted parallel to the axis of the glass rods 3, a pressing spring 9 for pressing the scoring wheel 5 and the glass rods 3 against one another, a holddown means 15 for pressing against the glass rods 3, a breaking bar 11 and a breaking beam 13. The breaking bar 11 is arranged opposite, with respect to the glass rods 3, between the holddown means 15 and the breaking beam 13. The breaking bar 11 is also positioned opposite the scoring wheel 5, which is guided between the holddown means 15 and the breaking beam 13, and serves as an abutment for the pressure exerted on the glass rods by the scoring wheel 5.

For the scoring, a device for guiding the glass rods 3 and the scoring wheel 5 past one another in a direction perpendicular to the axis of the glass rods 3 is provided. In this case, either the scoring wheel 5 with the scoring wheel holder 7 may be moved over the glass rods or, conversely, the glass rods 3 may be moved past the scoring wheel 5. The breaking bar 11, the holddown means 15 and the breaking beam 13 extend in a direction perpendicular to the axis of the glass rods 3 and along the direction of advancement 50, along which the glass rods 3 and the scoring wheel 5 are guided past one another. The holddown means 15 is not represented in FIG. 2, so that the scoring wheel holder 7 and the breaking beam are not concealed.

The scoring wheel 5 is rotatably mounted without any play in the axial direction, so that the scoring wheel 5 cannot run out from the intended direction in the direction along the axes of the glass rods 3.

The method carried out by means of the apparatus 1 for detaching portions of glass rods 3 is based on the glass rods 3 being held in a parallel and laterally fixed manner, the glass rods 3 and the scoring wheel 5 rotatably mounted parallel to the axis of the glass rods 3 being guided past one another in a direction perpendicular to the axis of the glass rods 3 and the scoring wheel and the glass rods being pressed against one another by means of the pressing spring 9. The scored glass rods 3 are then bent between the holddown means 15 and the breaking beam 13 by means of the breaking bar 11 arranged opposite, between the breaking beam 13 and the holddown means 15, so that portions 30 of the glass rods are detached at the scoring location. The scoring wheel 5 is rolled over the glass rods by means of the apparatus in such a way that the scoring wheel 5 is in each case in contact with a glass rod, and exerts pressure on the glass rod 3, for a time period of 0.05 of a second to 0.5 of a second.

In the case of this exemplary embodiment, the pressure required for the scoring is exerted by the scoring wheel 5 on the glass rods 3 by means of a compressed pressing spring 9, which acts on the scoring wheel holder in the way represented in FIGS. 1 to 3.

In FIG. 4, details of the holddown means 15 are represented. The holddown means 15 has elastic holding devices 150 for the glass rods 3. These holding devices 150 comprise holding elements 153, which are held on springs 152 and guided in channels 151, for exerting spring forces in the direction of the pressing direction of the scoring wheel 5. The holding elements 153 are also provided with notches, in which the glass rods are laterally fixed. During scoring, the glass rods do not need to be turned in the notches, since scoring only needs to be performed along part of the circumference of the glass rods 3 that is facing the scoring wheel, and the glass rods can therefore be held in a rotationally fixed manner. The refinement of the invention with elastic holding elements 153 is of advantage, since the glass rods 3 are pressed by the springs 152 against the breaking bar 11 with defined spring forces. A uniform bending moment is also exerted on all the glass rods 3 by means of the springs during breaking when the glass rods are bent by the breaking beam. In order to achieve this, alternatively or in addition the breaking beam may also be provided with corresponding elastic holding elements.

FIGS. 5 to 7 show details of an exemplary embodiment of a scoring wheel holder. Of these, FIG. 5 shows the scoring wheel holder 7 in side view in the direction of the axis of the scoring wheel. FIG. 6 shows a front view from the direction of the arrow "A" in FIG. 5. In FIG. 6, a perspective view of the arrangement is represented for further illustration.

The scoring wheel holder 7 comprises a lever 71 with lever arms 72, 73, the scoring wheel 5 being fastened to the lever arm 72. The lever 71 is mounted on a bearing block 8 with a ball bearing and is consequently rotatable, or pivotable, about the ball bearing axis. The pressure on the glass rods 3 that is necessary for the scoring is brought about by means of a pressing spring 9, which is fastened between the bearing block 8 and the lever arm 73 and exerts on the lever arm 73 a spring force which is transferred via the axis 74 to the lever arm 72 with the scoring wheel 5 fastened to it. By means of a setting screw 83, the spring force acting on the lever arm 73 can be adjusted.

In the case of the exemplary embodiment represented in FIGS. 5 to 7, the bearing block comprises two bearing block halves 81, 82. Formed between these halves is a slit 86, through which the lever 71 of the scoring wheel holder 7 protrudes. The surfaces 84, 85 of the bearing block parts 81, 82 that are facing the lever 71 and the side surfaces 74, 75 of the lever 71 form corresponding guiding surfaces, in particular sliding surfaces, with which the scoring wheel holder 7 is guided laterally in relation to the direction of advancement 50. Consequently, running out of the scoring wheel 5 laterally in relation to the direction of advancement 50 is avoided, or at least reduced, so that in particular close tolerances can be maintained in the length of detached portions 30.

FIG. 8 shows in a sectional representation a refinement of the apparatus that is shown in FIGS. 1 to 3. The viewing direction in FIG. 8 corresponds to FIG. 1. In the case of the exemplary embodiment shown in FIG. 8, the stroke movement of the scoring wheel 5 is not carried out by means of a lever and a pivoting movement brought about by turning of the lever, but by means of a linear guidance. It goes without saying that it is possible, however, also to combine the mechanism shown in FIG. 8 additionally with a lever as a component part of the scoring wheel holder 7.

The linear guidance of the scoring wheel holder 7 shown in FIG. 8 comprises a carriage 701, to which the scoring wheel 5 is rotatably fastened. The carriage is guided in a guide element 710 linearly in a direction transverse to the axes of the glass rods 3 and the direction of advancement (in the representation in FIG. 8, the latter extends perpendicularly in relation to the plane of the image) for carrying out a stroke movement. In order to make low-friction guidance possible, rolling-contact bearings 702 are provided by way of example. It goes without saying, however, that other bearings, for example ball bearings or a sliding bearing arrangement, may also be provided.

Furthermore, instead of the spiral spring represented in the previous figures, a gas pressure spring 91 with a gas pressure cylinder 92 and a piston rod 93 is used as the pressing spring 9. In addition, a hydraulic damping element 95 may be provided, in order to damp the movement of the scoring wheel in the direction of the stroke and so achieve a more uniform contact pressure in the stroke movement of the scoring wheel 5 that follows the contour of the glass rods 3.

In FIG. 9, an exemplary embodiment of a pressing spring 9 in the form of a dynamic gas flow spring 95 is represented in a sectional view. This spring 95 may for example replace or supplement each of the pressing springs represented in the previous figures. Just like the gas pressure spring 91 shown in FIG. 8, the dynamic gas flow spring 95 comprises a cylinder 92 and a piston rod 93, to which a piston running in the cylinder is fastened.

Gas is forced into the piston space 99 via an inflow channel 96, so that gas pressure building up in the space swept by the piston stroke acts on the piston 98. This is transferred to the piston rod 93 and on further to the scoring wheel. The piston 98 runs in the cylinder 92 without being sealed, so that the gas can flow out from the swept space around the piston and escape from the lower cylinder opening 97.

To improve the flow conditions, the upper part of the swept space 99 and of the piston 98 may for example be conically configured. As an alternative to the gas flowing around, it is also possible for example for there to be lateral bores in the cylinder, through which the gas flows out from the swept space 99. Such a gas pressure spring has the advantage over a static gas pressure spring that the gas pressure is substantially independent of the position of the piston. This achieves the effect that a constant pressure is exerted on the glass rods by the scoring wheel.

In FIG. 10, an exemplary embodiment of a glass rod portion 30 produced according to the invention as described above, by scoring and breaking with an apparatus according to FIGS. 1 to 7, is represented. The glass rod portion 30 has been detached from a cylindrical solid glass rod. Accordingly, the glass rod portion 30 has a cylindrical form with a cylindrical lateral surface 31.

The end faces of the cylindrical portion are formed by fracture surfaces 33 and 34, which were obtained directly by the scored breaking. The end faces 33, 34 are in this case perpendicular to the lateral surface, or the axis of rotational symmetry 32. The tolerance in the overall length, that is to say the distance between the two fracture surfaces 33, 34, is less than ±0.08 of a millimeter. Specifically, a length tolerance of only ±0.06 of a millimeter has been maintained.

Furthermore, the angularity of the fracture surfaces 33, 34 perpendicular to the lateral surface 31 is less than ±0.08 of a millimeter per millimeter of outside diameter, in the case of a diameter of the lateral surface of 1.1 millimeters a tolerance in the angularity of ±0.06 of a millimeter even being maintained. The planarity of the fracture surfaces 33, 34 is better than 0.06 of a millimeter per millimeter of outside diameter, it even being possible in the case of glass rod portions with a diameter of 1.1 millimeters for a tolerance in the planarity of 0.04 of a millimeter to be maintained.

FIG. 11 and FIG. 12 show two pictures taken with a scanning electron microscope of the scoring edges of different scoring wheels. The magnification in the two pictures is the same. For the purposes of illustration, a comparative distance of 10 μm. in length is depicted in each case. FIG. 11 shows a scoring wheel with a very sharp edge, which extends perpendicularly from top to bottom approximately in the middle of the image. The scoring edge also extends from top to bottom in the case of the micrograph shown in FIG. 12 of a different scoring wheel. However, the scoring edge of this scoring wheel is much more poorly defined and significantly wider. So, the entire rough region, which appears dark and extends over the entire lower left-hand half of the picture in the lower edge of the picture and tapers upward in the form of a wedge, contributes to the scoring of the glass rod. This creates a scoring zone which is significantly wider, as compared with scoring by a scoring wheel shown in FIG. 11.

In FIG. 13, such a scoring zone 55 on a glass rod 3 is schematically represented. The glass rod 3 is shown in FIG. 13 as a detail. The region on the lateral surface 31 of the glass rod 3 that forms the outer delimitation of the scoring traces 56 introduced by the scoring wheel is understood as the scoring zone. This region is illustrated by a dashed line. The scoring zone is made to extend in a way corresponding to the scoring along a direction of advancement 50 in a direction perpendicular to the axis of rotational symmetry or center axis 32 of the glass rod 3.

With regard to the scoring wheels represented in FIGS. 11 and 12, it is therefore surprisingly found that a greater accuracy of the fracture surfaces is achieved in the case of the scored breaking according to the invention with the scoring wheel shown in FIG. 12. In a way corresponding to the width of the scoring edge, a scoring zone 55 with a width of at least 20 micrometers, even of 40 micrometers, is introduced on the lateral surface 31 of the glass rod 3 by this or a comparable edge. In this case, the width of the scoring zone is understood as meaning its extent in the direction of the center axis 32.

It is evident to a person skilled in the art that the invention is not restricted to the exemplary embodiments described above, but rather can be varied in many diverse ways. In particular, the features of the individual exemplary embodiments can also be combined with one another.

The invention claimed is:

1. An apparatus for detaching portions of glass rods, comprising:
    a breaking bar having a first side and a second side and a crest surface that extends in a first direction and supports a number of glass rods that are parallel to one another and extend in a second direction perpendicular to the first direction so that first arm sections of said glass rods extend on said first side of said breaking bar and second arm sections of said glass rods extend on said second side of said breaking bar;
    wherein said glass rods are held and fixed in parallel and lateral fixed relationship;
    a hold down means engaging said first arm sections of said glass rods for pressing said glass rods against said crest surface in a third direction perpendicular to said first and second directions;
    a breaking beam engaging said second arm sections of said glass rods for pressing said glass rods against said crest surface of the breaking bar in said third direction;
    a scoring wheel disposed between said hold down means and said breaking beam and, with interposition of a respective glass rod, directly opposite to said breaking bar, said scoring wheel being for scoring a number of parallel traces in said first direction within a scoring zone in each said glass rod;
    a scoring wheel holder for rotably mounting said scoring wheel around an axis parallel to said second direction;
    at least one pressing spring for pressing said scoring wheel in said third direction against said glass rods; and
    wherein said parallel and lateral held and fixed glass rods and said scoring wheel past one another parallel to said first direction so as to score said traces in the glass rods when said glass rods pass said scoring wheel;
    wherein the glass rods are fixed in a rotationally fixed manner by elastic holding elements;
    wherein the hold down means and the breaking beam are with respect to the glass rods arranged opposite to the breaking bar bringing about an exact three-point bearing of the glass rods during scoring and breaking; and
    wherein the scored glass rods are bent in said scoring zone opposite said breaking bar by action from said hold down means and said breaking beam, and said glass rods are broken with a planar, uniform fracture surface that develops from said scoring zone to said crest surface.

2. The apparatus as claimed in claim 1, wherein the scoring wheel (5) is rotatably mounted without any play in the axial direction.

3. The apparatus as claimed in claim 1, wherein the breaking bar (11) and the breaking beam (13) extend in a direction perpendicular to the axis of the glass rods (3).

4. The apparatus as claimed in claim 1, wherein the scoring wheel holder comprises a rotatably mounted lever, on which the scoring wheel (5) is held.

5. The apparatus as claimed in claim 4, wherein the pressing spring acts on a lever arm of the lever.

6. The apparatus as claimed in claim 1, wherein the scoring wheel holder is laterally guided in a bearing block by means of corresponding guiding surfaces.

7. The apparatus as claimed in claim 1, wherein the scoring wheel holder comprises a carriage which is guided transversely in relation to the direction of advancement and the axes of the glass rods, to which the scoring wheel is fastened and on which the pressing spring acts.

8. The apparatus as claimed in claim 1, which comprises one of i) a hydraulic damping element and ii) a pneumatic damping element for damping the movement of the scoring wheel.

9. The apparatus as claimed in claim 1, which further comprises a pneumatic pressing spring.

10. The apparatus as claimed in claim 9, which further comprises a dynamic gas flow spring.

11. The apparatus as claimed in claim 1, wherein one of the holddown means (15) and the breaking beam (13) has elastic holding elements for the glass rods (3), for the exertion of spring forces in the direction of the pressing direction of the scoring wheel (5).

12. The apparatus as claimed in claim 1, which comprises a scoring wheel with a scoring edge that leaves behind a scoring zone with a width of at least 20 micrometers, on the lateral surface of the glass rod.

13. A method for detaching portions of glass rods, comprising the steps of:
holding a number of parallel glass rods in a fixed relationship on a crest surface of a breaking bar so that first arm sections of said glass rods extend on a first side of said breaking bar and second arm sections of said glass rods extend on a second side of said breaking bar, where the crest surface extends in a first direction and the parallel glass rods in a second direction perpendicular to the first direction, and wherein the glass rods are fixed in a rotationally fixed manner by elastic holding elements;
engaging said glass rods over said crest surface by engagement of a hold down means on said first arm sections and a breaking beam on said second arm section in a third direction perpendicular to said first and second directions;
pressing a scoring wheel onto said glass rods in regions over said crest surface by means of at least one pressing spring in said third direction;
guiding said scoring wheel and said parallel glass rods relative to one another in said first direction and scoring the glass rods along scoring zones that extend parallel to said first direction and include a number of scoring traces in each said scoring zone; and
then breaking portions from said glass rods by bending said glass rods in said scoring zone over said crest surface by means of said hold down means and said breaking bar acting in said third direction, whereby planar, uniform fracture surfaces that develop from each said scoring zone to said crest surface are formed;
wherein an exact three-point bearing of the glass rods is brought about during scoring and breaking by arranging the hold down means and the breaking beam with respect to the glass rods opposite to the breaking bar.

14. The method as claimed in claim 13, the breaking bar (11) being arranged opposite the scoring wheel (5), which is guided between the holddown means (15) and the breaking beam (13), and acting as an abutment for the pressure exerted on the glass rods (3) by the scoring wheel (5).

15. The method as claimed in claim 13, wherein the scoring wheel (5) is rotatably mounted without any play in the axial direction.

16. The method as claimed in claim 13, wherein the scoring is introduced by the scoring wheel (5) only into part of the circumference of the glass rod.

17. The method as claimed in claim 13, wherein portions of solid glass rods are detached.

18. The method as claimed in claim 13, wherein tubes of relatively long glass rods (3) are detached.

19. The method as claimed in claim 13, wherein the scoring wheel (5) is held by a rotatably mounted lever (71).

20. The method as claimed in claim 19, wherein the pressing spring (9) acts on a lever arm (73) of the lever (71).

21. The method as claimed in claim 13, wherein the scoring wheel holder (7) is laterally guided in a bearing block (8) by means of corresponding guiding surfaces (74, 75, 84, 85).

22. The method as claimed in claim 13, wherein the scoring wheel is held on a carriage which is guided transversely in relation to the axes of the glass rods and the direction of advancement and, when the glass rods and scoring wheel are guided past one another and the scoring wheel rolls on the glass rods, the carriage is moved in the guide by the glass rods against the spring force of the pressing spring.

23. The method as claimed in claim 13, wherein the movement of the scoring wheel is one of i) hydraulically damped and ii) pneumatically damped.

24. The method as claimed in claim 13, wherein the scoring wheel is pressed against the glass rods by a pneumatic pressing spring.

25. The method as claimed in claim 24, wherein the scoring wheel is pressed against the glass rods by a dynamic gas flow spring.

26. The method as claimed in claim 13, wherein the glass rods (3) are pressed onto the opposite breaking bar (11) by spring forces exerted by one of the holddown means (15) and the breaking beam (13) during the scoring.

27. The method as claimed in claim 13, wherein pressure is exerted on a glass rod by the scoring wheel for a time period of 0.05 of a second to 0.5 of a second.

28. The method as claimed in claim 13, wherein a scoring zone with a width of at least 10 micrometers, is introduced on the lateral surface of the glass rod by the scoring wheel.

* * * * *